United States Patent
Augustine et al.

(10) Patent No.: US 11,161,694 B2
(45) Date of Patent: Nov. 2, 2021

(54) COMPRESSED GAS ENERGY STORAGE

(71) Applicant: Alliance for Sustainable Energy, LLC, Golden, CO (US)

(72) Inventors: Chad Augustine, Evergreen, CO (US); David Levi Young, Golden, CO (US); Henry Ellis Johnston, Jr., Golden, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 206 days.

(21) Appl. No.: 16/515,923

(22) Filed: Jul. 18, 2019

(65) Prior Publication Data
US 2020/0039749 A1 Feb. 6, 2020

Related U.S. Application Data

(60) Provisional application No. 62/700,054, filed on Jul. 18, 2018.

(51) Int. Cl.
| *B65G 5/00* | (2006.01) |
| *E21B 43/16* | (2006.01) |
| *E21B 43/26* | (2006.01) |

(52) U.S. Cl.
CPC ............ *B65G 5/005* (2013.01); *E21B 43/168* (2013.01); *E21B 43/26* (2013.01)

(58) Field of Classification Search
CPC ........ B65G 5/005; E21B 43/168; E21B 43/26
See application file for complete search history.

(56) References Cited

U.S. PATENT DOCUMENTS

| 3,786,858 | A | 1/1974 | Potter et al. |
| 2006/0048770 | A1 | 3/2006 | Meksvanh et al. |
| 2013/0031910 | A1* | 2/2013 | Merchant ........... B01D 53/8631 60/772 |
| 2013/0091854 | A1* | 4/2013 | Gupta .................... F02M 26/00 60/772 |
| 2013/0121767 | A1* | 5/2013 | Bernica ..................... F02C 6/16 405/53 |
| 2014/0262292 | A1* | 9/2014 | Joseph .................... E21B 43/26 166/308.1 |
| 2019/0078014 | A1* | 3/2019 | Schmidt .................. E21B 43/26 |

OTHER PUBLICATIONS

Atan, S. et al., "The Viability of Gas Injection EOR in Eagle Ford Shale Reservoirs," Society of Petroleum Engineers, 2018, SPE-191673-MS, 32 pages.
Augustine, C. et al., "A Comparison of Geothermal With Oil and Gas Well Drilling Costs," Proceedings, Thirty-First Workshop on Geothermal Reservoir Engineering, Stanford University, Stanford, California, Jan. 30-Feb. 1, 2006, SGP-TR-179, 15 pages.
DOE Workshop for Enhanced Geothermal Systems Technology Evaluation, Jun. 7-8, 2007, Washington, D.C., 28 pages.

(Continued)

*Primary Examiner* — Crystal J Miller
(74) *Attorney, Agent, or Firm* — Alexandra M. Hall

(57) ABSTRACT

Methods and systems for thermal energy storage and enhanced oil recovery are described herein. In some embodiments, natural gas may be injected down a well which has been previously hydraulically fractured to store thermal energy and to stimulate the well to greater hydrocarbon production.

16 Claims, 8 Drawing Sheets

(56) References Cited

OTHER PUBLICATIONS

DOE "An Evaluation of Enhanced Geothermal Systems Technology," Geothermal Technologies Program, 2008, 37 pages.
DOE Geothermal Technologies Program, Multi-Year Research, Development and Demonstration Plan, 2008, 149 pages.
Elmegaard, B. et al., "Efficiency of Compressed Air Energy Storage," 2011, published in the 24th International Conference on Efficiency, Cost, Optimization, Simulation and Environmental Impact of Energy Systems, 13 pages.
Entingh, D., DOE Geothermal Electricity Technology Evaluation Model (GETEM): vol. I, Technical Reference Manual, Jul. 6, 2006, 86 pages.
Gulen, S. Can et al., "Compressed Gas Energy Storage," Power Engineering, vol. 121, Issue 8, Aug. 21, 2017, 24 pages. Accessed Sep. 19, 2019 at http://www.power-eng.com/articles/print/volume-121/issue-8/ffeatures/compressed-gas-energy-storage.html.
Hagoort, J., "Prediction of wellbore temperatures in gas production wells," Journal of Petroleum Science and Engineering, vol. 49, 2005, pp. 22-36.
Jacobs, T., "Shale EOR Delivers, So Why Won't the Sector Go Big?", https://pubs.spe.org/en/print-article/?art=5360, accessed Oct. 9, 2019, 2 pages.
National Energy Technology Laboratory (NETL), Strategic Center for Natural Gas and Oil, "Modern Shale Gas Development in the United States: An Update," Sep. 2013, 79 pages.
Phillips, B. et al., "A Roadmap for Strategic Development of Geothermal Exploration Technologies," Proceedings, Thirty-Eighth Workshop on Geothermal Reservoir Engineering, Stanford University, Stanford, California, Feb. 11-13, 2013, SGP_TR-198, 12 pages.
Polsky, Y. et al., "Enhanced Geothermal Systems (EGS) Well Construction Technology Evaluation Report," Sandia Report, Dec. 2008, SAND2008-7866, 108 pages.
Portier, S. et al., "Chemical stimulation techniques for geothermal wells: experiments on the three-well EGS system at Soultz-sous-Forets, France," Elsevier Geothermics, vol. 38, 2009, pp. 349-359.
Robertson-Tait, A. et al., "Potential Sites and Experiments for Enhanced Geothermal Systems in the Western United States," Proceedings World Geothermal Congress 2000, Kyushu-Tohoku, Japan, May 28-Jun. 10, 2000, 6 pages.
Succar, S. et al., "Compressed Air Energy Storage: Theory, Resources, and Applications for Wind Power," Princeton Environmental Institute, Princeton University, Energy Systems Analysis Group, Apr. 8, 2008, 81 pages.
Think GeoEnergy, Geothermal Energy News, "Combining solar thermal with geothermal to be tested in Nevada," Homepage (http://www.thinkgeoenergy.com), accessed Oct. 9, 2019, 2 pages.
Wang, L. et al., "A multi-scale flow model for production performance analysis in shale gas reservoirs with fractal geometry," Scientific Reports, vol. 8, 2018, 18 pages.
Wyborn, D., "Enhanced Geothermal Systems (EGS)—Where Are We Now," Abstract only, American Geophysical Union, Fall Meeting 2011, abstract id. IN31D-02.
Baria, R. et al., "Economic and Technical Case for Commercial Exploitation of EGS," Proceedings, Thirty Third Workshop on Geothermal Reservoir Engineering, Stanford University, Stanford, California, Jan. 28-30, 2008, SGP-TR-185, 5 pages.

\* cited by examiner

COMPRESSED GAS ENERGY STORAGE

CROSS-REFERENCE TO RELATED APPLICATIONS

This application claims the benefit of U.S. Provisional Application No. 62/700,054 filed on Jul. 18, 2018, the contents of which are incorporated herein by reference in their entirety.

CONTRACTUAL ORIGIN

The United States Government has rights in this invention under Contract No. DE-AC36-08GO28308 between the United States Department of Energy and Alliance for Sustainable Energy, LLC, the Manager and Operator of the National Renewable Energy Laboratory.

BACKGROUND

Compressed-air energy storage (CAES) has been utilized as a cost-effective, grid-scale energy storage technology. CAES operation is conceptually simple: during periods of excess electrical power, a compressor forces air into underground caverns. Typically, these are underground salt caverns. When electricity demand grows, this energy may be released through a turbine generator to produce electricity. However, few locations possess suitable geology, and developing subsurface storage reservoirs (e.g., salt dome caverns) carries inherent risk and uncertainty that may derail projects. Conventional CAES projects are typically 100+ MW installations, requiring a market with significant excess energy storage needs and a large (i.e., several billions of dollars) capital investment.

SUMMARY

An aspect of the present disclosure includes a system for storing thermal energy, the system comprising a compressor configured to compress a gas thereby creating a compressed gas, a pump configured to: inject the compressed gas into a reservoir of an oil well, and produce the compressed gas from the reservoir, and an expander configured to expand the compressed gas produced from the reservoir.

In some embodiments, the system also includes a solar array for generating thermal energy which may be stored in the gas. In some embodiments, the system also includes at least one wind turbine for generating thermal energy which may be stored in the gas.

In some embodiments, the gas may be stored in the reservoir for a period of time. In some embodiments, the compressor is configured to increase the temperature and pressure of the gas. In some embodiments, the expander is configured to decrease the temperature and pressure of the gas. In some embodiments, the gas is natural gas.

An aspect of the present disclosure includes a method comprising in order: routing a first quantity of a first gas through a compressor, injecting the first quantity of the first gas into a reservoir through an oil well, removing a second quantity of a second gas from the reservoir, and routing the second quantity of the second gas through an expander. In some embodiments, the method also includes adding an amount of air to the second quantity of the second gas during the removing. In some embodiments, the amount of air is combusted prior to the routing of the second quantity of the second gas through the expander. In some embodiments, the amount of air is sub-stoichiometric. In some embodiments, the first quantity of the first gas and the second quantity of the second gas are approximately equivalent. In some embodiments, the first quantity of the first gas is less than the second quantity of the second gas. In some embodiments, the second gas is a mixture of at least one of natural gas, oil, or water. In some embodiments, the method also includes storing the first quantity of the first gas in the reservoir for a period of time. In some embodiments, the first gas is natural gas. In some embodiments, the oil well had previously been hydraulically fractured.

DETAILED DESCRIPTION

Disclosed herein are systems and methods for storing thermal energy in oil and gas reservoirs in the form of a compressed gas. The methods and systems may also be utilized for enhanced oil recovery. Some methods described herein may store excess electrical energy in the form of compressed gas in unconventional reservoirs using wells that have been hydraulically fractured (i.e., "fracked") to provide a grid-scale intermittent dispatchable storage solution. The present disclosure may use the natural geothermal gradient and subsurface thermal energy storage to increase the round-trip efficiency of thermal energy storage processes and decrease equipment requirements.

Unconventional reservoirs are reservoirs (i.e., permeable rock) that require special recovery operations outside of conventional operating practices to remove the hydrocarbons in the unconventional reservoir. Unconventional reservoirs include tight gas sands, oil and gas shales, coalbed methane, heavy oil and tar sands, and gas-hydrate deposits. The removal or extraction of hydrocarbons, water, or other substances from an oil well is known as production.

Production from unconventional shale reservoirs is possible because of hydraulically fractured wells, some of which are horizontal. An oil well that has been hydraulically fractured has fractures in the formation of the reservoir which result in greater permeability from the reservoir to the wellbore. The dual-porosity environment facilitates the flow of hydrocarbons from small pores of the matrix of the reservoir, to the hydraulic fractures, then to the wellbore. When the well begins to flow (meaning hydrocarbons are produced at the surface), fluid in the hydraulic fractures is produced more quickly than fluids from the matrix of the reservoir. Thus, production is initially dominated by hydraulic fracture flow, followed by flow from the matrix of the reservoir through the hydraulic fractures.

Figure 1:
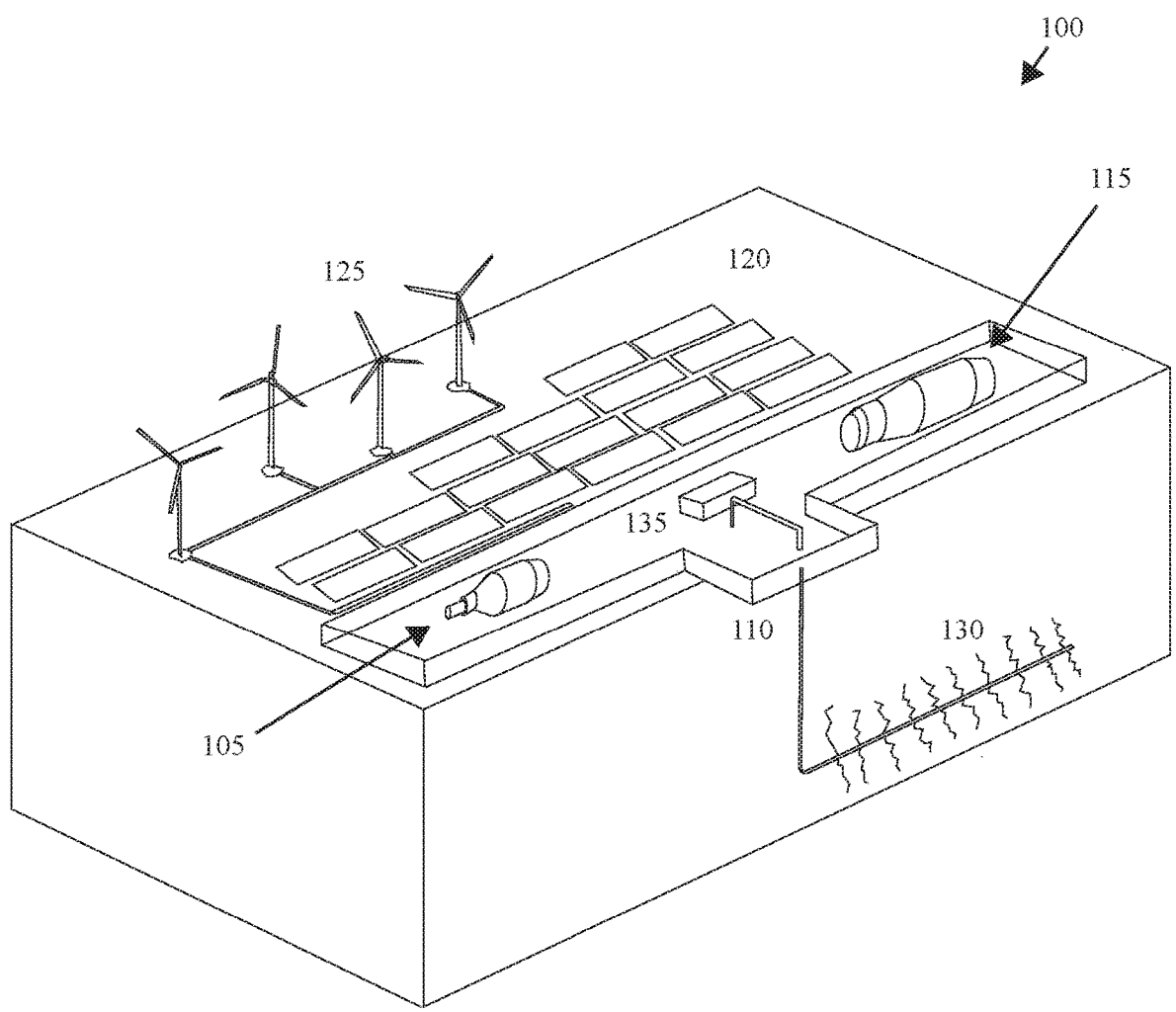
FIG. 1 illustrates a conceptual schematic of a facility for using compressed natural gas for thermal energy storage as described by some embodiments herein.

In some embodiments, compressed natural gas is stored in reservoirs by being injected by a pump into wells which have been hydraulically fracked but are no longer in production. FIG. 1 is a conceptual schematic showing one embodiment of a system 100 for using compressed natural gas for energy storage in accordance with one or more aspects of the present disclosure. The system 100 includes a compressor 105, an expander 115, a well 110 which had previously been hydraulically fractured and contains fractures 130, a surface thermal energy storage tank 135, and a source of renewable energy and electrical generation, shown as solar array 120 and wind farm 125. The well 110 extends into a reservoir and the fractures 130 exist to pull hydrocarbons from the reservoir to the well 110. In some embodiments the well may be horizontal, however, in other embodiments the well may be vertical.

The concepts of the present disclosure may be expanded and/or combined in various ways. The concepts may be combined with additional thermal energy storage on the surface and/or with heat addition from other external sources (example—industrial waste heat, geothermal heat sources) to increase energy output. This could be done in at thermal energy storage tank such as 135. The thermal energy on the surface may be stored in the form of hot water or molten salt. This may be useful for getting the inlet conditions to the point where the compressor/expander can be combined into a single unit. Additionally, thermal energy could be stored on the surface. The thermal energy stored at the surface or stored in the natural gas in the reservoir could come from cheap solar collectors 120 or wind farms 125 which generate electrical energy which may be converted into thermal energy, for example. The thermal energy could also come from the combustion/compression of the natural gas after it is produced from the well. Injecting a small amount of air into the natural gas stream during production and combusting it prior to the expander may be used to increase the inlet temperature to the expander. The amount of air may be sub-stoichiometric, meaning it does not fully combust the natural gas. That is, the amount of air is less than the natural gas such that only a portion of the natural gas may combust. This may also remove water vapor which may be present with the natural gas. In some embodiments, the expander may be connected to a turbine generator to generate electricity. In other embodiments the expander may be a turbine generator or a piston generator.

In some embodiments, the present disclosure uses depleted unconventional shale and tight sandstone dry gas wells that have been hydraulically fractured and repurposes them to store energy in the form of compressed natural gas rather than storing energy by utilizing salt dome caverns to store compressed air. The techniques of the present disclosure may be used capture thermal energy from the compression of the natural gas at elevated temperatures and use the subsurface formation and natural geothermal temperature gradient to store the thermal energy. Geothermal gradient is the rate of increase in temperature per unit of depth in the Earth; the geothermal gradient may vary based on location but averages 25-30° C./km (or approximately 15° F./1000 ft). This increase in temperature down the well may increase the temperature (i.e., the energy content) of the stored gas.

Natural gas is native to the reservoir and meets the original design parameters for the well, meaning it will not corrode the equipment. Sources and sinks for natural gas are generally available at the well site from natural gas collection and transmission pipelines.

In some embodiments, a minimum number of compression and expansion stages may be needed in the thermal energy storage process, which may reduce equipment cost and complexity. Natural gas may undergo smaller overall temperature changes because of the small expansion and compression ratios compared to the temperature changes of compressed air; air has an initial pressure approximately equivalent to the ambient, while natural gas as an initial pressure approximately equivalent to the collection pressure. This temperature stability may eliminate the need for inter-stage heat exchangers that conventional CAES with compressed air often requires for cooling (during compression) and heating (during expansion) of the natural gas. Natural gas exits the compressor at temperatures (~150° C. or ~300° F.) that can be safely injected via a pump into the shale reservoir. If the bottom-hole temperatures are roughly equivalent to the temperatures at which the natural gas exits the compressor due to the natural geothermal gradient or the heating of the reservoir by the injection of large quantities of compressed natural gas, the reservoir may be able to store the thermal energy carried by the natural gas indefinitely. That is, the natural geothermal gradient will not reduce the amount of energy stored in the compressed natural gas and may, in some embodiments, increase it. The ability of the reservoir to maintain and/or increase the temperature of the natural gas is a key component to maintaining the thermal energy potential of the gas. The reservoir returns the stored natural gas at temperatures sufficiently high that heating during expansion may not be required.

In some embodiments, the injection of the natural gas and removal of the natural gas may result in a loss of heat of the natural gas. That is, in some embodiments thermal energy losses may occur when the natural gas is injected into the well (using a pump) and/or reservoir and/or when the natural gas is removed from the well and/or reservoir. This may occur when the bottom-hole temperature is significantly lower than the temperature at which the natural gas exits the compressor. In such instances, it may be beneficial to insulate the well. As tubes are confined within the wellbore to In some embodiments, the surface equipment required for utilizing compressed natural gas for thermal energy storage may be a single combined compressor/expander unit. That is, the same piece of equipment may perform the compression of the natural gas prior to injection into the well and perform expansion of the natural gas after production from the well.

Figure 2:
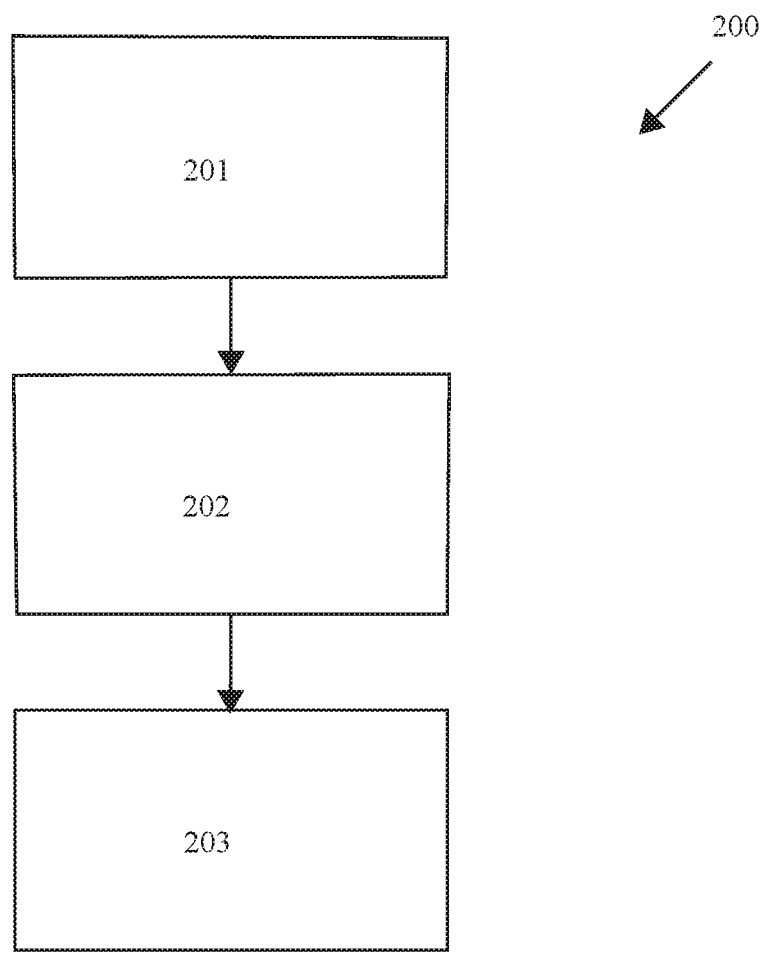
FIG. 2 illustrates a method for thermal energy storage and/or enhanced oil recovery as described by some embodiments herein.

FIG. 2 illustrates a method 200 for thermal energy storage and/or enhanced oil recovery as described by some embodiments herein.

A first step 201 for storing thermal energy in a reservoir using a well which has been previously fractured is injection. During this step, the natural gas (or other thermal energy storage medium) may be routed through a compressor (e.g., the compressor 105), where its pressure and temperature are increased. Then the natural gas may be injected down the well (e.g., well 110) where it may enter the reservoir through fractures made by previous hydraulic fracturing (e.g., hydraulic fractures 130).

A second step 202 for storing thermal energy in a reservoir using a well which has previously been fractured is storage. During this step, the natural gas may be stored (i.e., left) in the reservoir for a certain period of time. The time the natural gas remains in the reservoir may vary by the need for utilization of the thermal energy and/or the temperature restraints of the well (e.g., well 110) and reservoir. The period of time may be a few hours, a single day, several days, a single week, several weeks, a single month, or several months.

A third step 203 for storing thermal energy in a reservoir using a well which has previously been fractured in production (also called removal). During this step, the natural gas may be removed from the reservoir through the well (e.g., well 110) and used for energy generation. After being produced from the well 110 the natural gas may be routed through an expander (e.g., expander 115). The expander 115 may be attached to a turbine generator, which may generate electricity from the reduction in heat and pressure of the natural gas.

The injection, storage, and production of the natural gas may stimulate the reservoir and horizontal well, resulting in an increased production of hydrocarbons emerging from the well. That is, production of hydrocarbons from the well and reservoir may occur when the natural gas is removed from the reservoir. Injecting natural gas into the reservoir through the well may decrease the viscosity of oil in the reservoir and may result in increased production from the well. In some instances, when the natural gas is removed from the well, oil may be removed as well. Then the oil and natural gas may be separated. The natural gas may continue to be used for thermal energy storage and/or energy generation, and the oil may be collected for later use.

In some instances, water may be produced from the reservoir when the natural gas is removed from the well. The permeability of a given fluid in rock is affected by the presence of other fluids in the rock. Relative permeability curves describe the permeability of a given phase (e.g., "gas") as a function of liquid saturation. Even "dry gas" reservoirs contain water. At irreducible liquid saturations, significant volumes of liquid-phase water will not flow in the reservoir. However, at reservoir temperatures and pressures, natural gas is soluble in water and water is soluble in natural gas. Therefore, small volumes of water may be produced from methods described herein of injecting, storing, and producing natural gas from dry-gas shale reservoirs. Because the natural gas may include water in liquid form when removed from the well, the expander should be able to handle gas and liquid phases.

Figure 3:
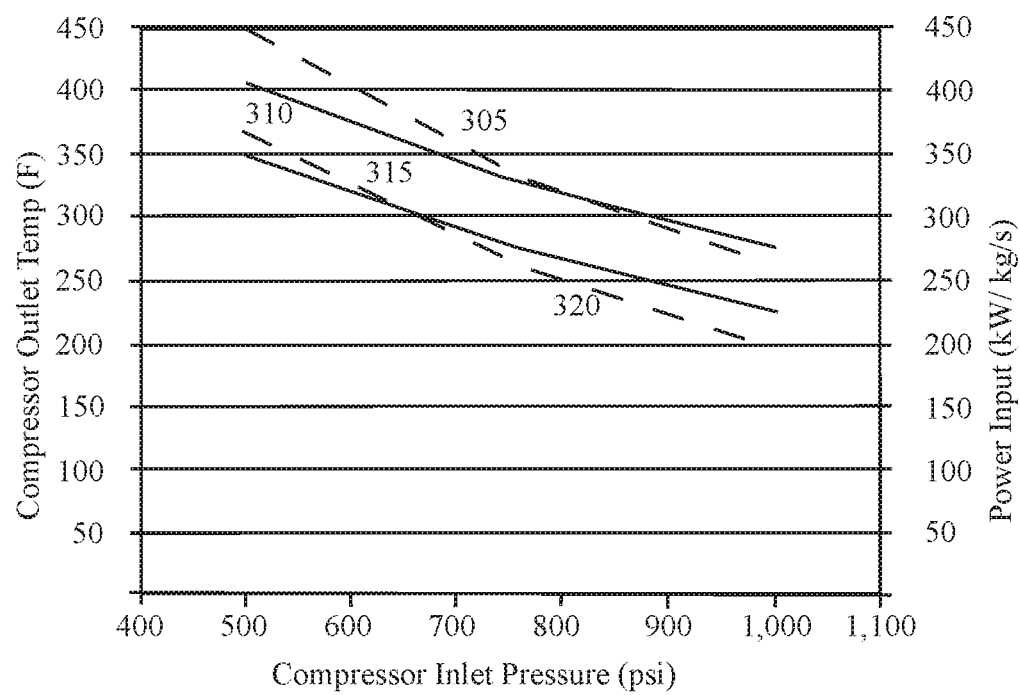
FIG. 3 shows example calculations of natural gas outlet temperature and power input for a compressor as a function of inlet pressure.

FIG. 3 shows example calculations of natural gas outlet temperature and power input for a compressor (such as compressor 105) as a function of inlet pressure according to the present disclosure and illustrates the advantages described herein. Natural gas may enter the compressor 105 from collection pipelines at approximately 50° F. and 1,000 psi and leave the compressor 105 at ~275° F. and 4,000 psi. For calculation purposes this is similar to elevation conditions found in shale gas reservoirs, the performance would be similar if performed at lower conditions. If the natural gas is directly injected (without cooling), stored, and released through the expander (assuming expander inlet conditions identical to compressor exit conditions, star on right graphic), it exits the expander and is returned to collection pipelines at ~100° F. and 1,000 psi. This temperature is high enough to avoid concerns about water droplets condensing and damaging the expander, eliminating the need for preheating. The result is a compressed gas energy storage process that increases round-trip efficiency by storing thermal energy in a subsurface reservoir, eliminates the need for heat exchangers, avoids carbon dioxide ($CO_2$) emissions by eliminating combustion of natural gas before the expander, and could lower costs further by combining the compressor and expander in a single unit. The solid lines in FIG. 3 represent the temperature. The dashed lines in FIG. 3 represent the power. The inlet temperature was calculated at 50° F. Lines 305 and 310 show an outlet pressure of 3000 psi and lines 315 and 320 show an outlet pressure of 4000 psi.

Figure 4:
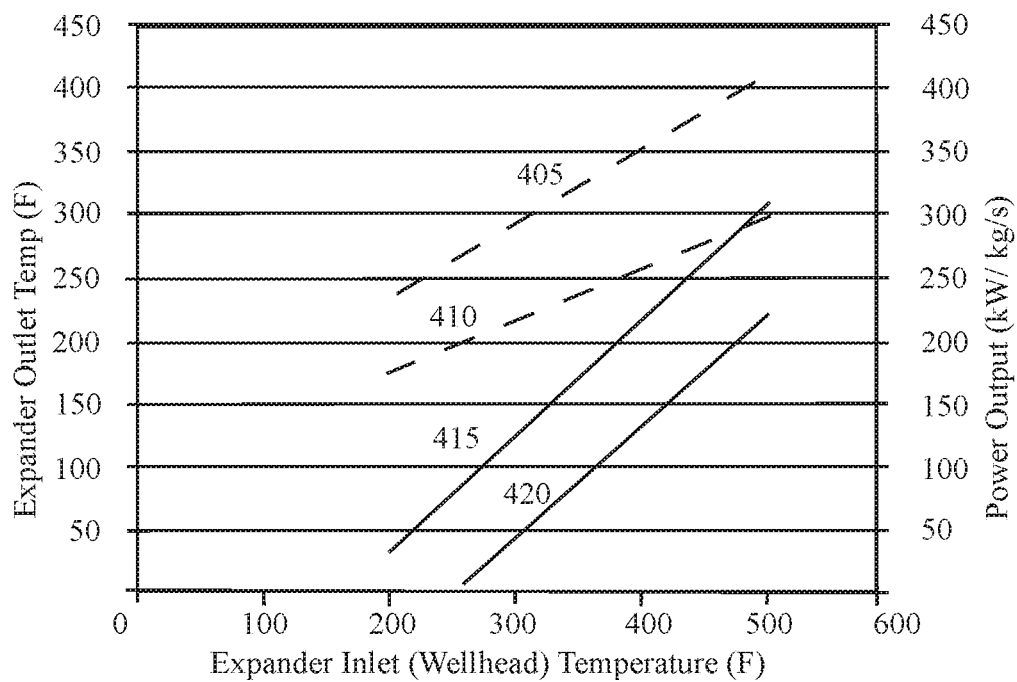
FIG. 4 shows example calculations of natural gas outlet temperature and power output for an expander as a function of inlet temperature.

FIG. 4 shows example calculations of natural gas outlet temperature and power output for expander as a function of inlet temperature. FIG. 4 can also be used to determine flow rate requirements for a given power output. The compressor may require approximately 260 kW/kg/s of natural gas, and the expander may produce approximately 200 kW/kg/s for a round-trip efficiency of approximately 75%. Under these operating conditions, a 1-MW Present disclosure plant would require a natural gas flow rate of about 5 kg/s or 18 million standard cubic feet per day (MMscfd). Initial flow rates from unconventional shale gas wells are generally in the millions of scf/d, indicating that reservoirs may produce natural gas at these rates. Preliminary reservoir modeling confirmed that depleted unconventional dry gas reservoirs are capable of injection and production at similar flow rates during 6-hour charge/discharge cycles. The dashed lines in FIG. 4 show the power and the solid lines show the temperature. Line 405 shows an outlet pressure of 500 psi, line 410 shows an outlet pressure of 1000 psi, line 415 shows an outlet pressure of 1000 psi, and line 420 shows an outlet pressure of 500 psi. The inlet pressure was assumed to be 4000 psi for these calculations.

Modeling runs were performed to analyze reservoir behavior during the operation of the methods described herein. The aim of the present disclosure is to allow for energy storage at both short-term (less than 24 hours) and long-term (over 30 days) intervals. A diurnal cycle of the present disclosure was modeled with 6 hours of natural gas injection (electricity storage), 6 hours of shutin (storage period), 6 hours of natural gas production (electricity generation), and 6 hours of shut in (recovery period). The goal of the diurnal energy storage cycles in this study and the present disclosure was to achieve steady-state operation of the reservoir cycles over time. The objectives included to maximize the natural gas flow rate (power generation capacity), minimize the well-head pressure difference between injection and production (round-trip efficiency), and achieve net-zero cumulative injection of natural gas over time (no leakage from the reservoir, and eliminate the need for purchasing natural gas). The first model was initialized at reservoir pressure and temperature. Next, natural gas was produced for one year to represent partial reservoir depletion. After a shutin period (usually 45 days), the diurnal energy storage cycle of the present disclosure was started by adjusting the well's flowing bottom-hole pressure (BHP). Flowing BHP was increased to a pre-determined level (above average reservoir pressure) and held constant during the injection phase, and it was decreased to a pre-determined level (below average reservoir pressure) and held constant during the production phase. The cycles were repeated for anywhere from one day to hundreds of days to observe if steady-state behavior was established.

In some embodiments, the reservoir behavior cycling may be controlled by differences between flowing pressures and average reservoir pressure, which is called pressure drive. Steady-state operation was defined as approximately net-zero natural gas injection over time. Stead-state operation could be achieved by setting the injection and production BHP's to the same value above and below (respectively) average reservoir pressure. For example, if average reservoir pressure was 2,000 psi, then steady-state operations could be achieved by setting the injection and production BHP to 2,500 psi and 1,500 psi, respectively.

Figure 5:
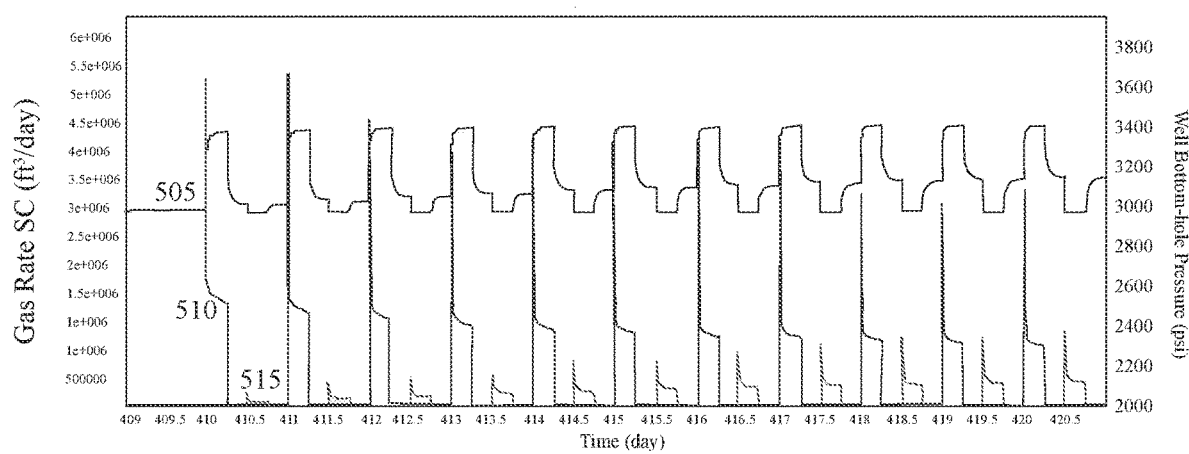
FIG. 5 illustrates the natural gas injection rate, production rate, and bottom-hole pressure during diurnal thermal energy storage cycling as described by some embodiments herein.

FIG. 5 shows the natural gas injection rate, production rate, and bottom-hole pressure during diurnal thermal energy storage cycling as described by some embodiments herein. The cycles shown in FIG. 5 use an injection bottom-hole pressure of 3,500 psi and a production bottom-hole pressure of 3,000 psi. The average reservoir pressure at the start of the cycling was approximately 3,000 psi. Operating outside of the steady-state regime may cause an imbalance between the pressure drive for the injection and production periods. For example, operating with an injection-cycle pressure drive greater than the production-cycle pressure drive results in net injection of natural gas, in which the injection flow rate is greater than the production flow rate (FIG. 5). With continued cycles, the average reservoir pressure drifts towards the average of injection and production BHPs. With time, some embodiments described herein may eventually reach steady-state conditions. Line 505 shows the BHP, line 510 shows the gas injection rate, and line 515 shows the gas production rate. In some embodiments, operating with a larger production cycle pressure may result in net production of natural gas.

Modeling of some embodiments also showed that BHP may return to average reservoir pressure within hours. This may demonstrate that the hydraulically fractured shale reservoir does not actually hold pressure after small volumes of gas are injected. The natural gas moves farther out into the fractures and rock matrix as the BHP pressure equilibrates to average reservoir pressure. However, the model of some embodiments does show that this natural gas may be produced back, so that over the long-term, the pressure in the reservoir can be managed and maintained at a desired operation point. The energy storage cycle as described by some embodiments herein may then be designed and optimized to operate around average reservoir pressure. Reservoir performance is measured by its injectivity and productivity indices, which quantify how high a flow rate may be achieved for a given pressure drive. The higher this value, the lower of the pressure-loss penalty (decrease in round-trip efficiency) and the better-suited the reservoir for energy storage.

In some embodiments, the injection volume of natural gas may be a function of how long the natural gas is to be stored in the well. If the natural gas is to be stored in the well for a shorter period of time (i.e., less than one week), the amount of natural gas injected may be 1-5 MMscfd (million standard cubic feet per day). If the natural gas is to be stored in the well for a longer period of time (i.e., more than one month), the amount of natural gas injected may be 50-150 MMscfd. For intermediate storage (i.e., more than one week but less than one month), the amount of natural gas injected may be 10-20 MMscf. In some embodiments, multiple injections of natural gas may occur before the natural gas is removed from the well.

In some embodiments, the gas utilized for thermal energy storage and enhanced oil recovery may be a gas other than natural gas. For example, hydrogen, diesel, pure methane, ethane, butane, or even air may be used in place of natural gas. The substance injected into the well ideally would be capable of being compressed prior to injection and then expanded after being removed from the well.

Several scenarios were modeled to predict injection and production rates at average reservoir pressures. All simulations applied a consistent pressure drive, where bottom-hole injection pressures are 500 psia above average reservoir pressure reservoir pressure and bottom-hole production pressures are 500 psia below average reservoir pressure.

Some embodiments may include an injection cycle followed by a shutin period, a production cycle, and another shutin period. Short-term cycle times may be approximately 6 hours, while long-term cycle times may be approximately 90 days. Simulated rates for short- and long-term storage at depleted reservoir pressures equal to 2,000 psia are provided in FIGS. 6A, 6B, 7A, 7B, 8A, and 8B.

Figure 6A:
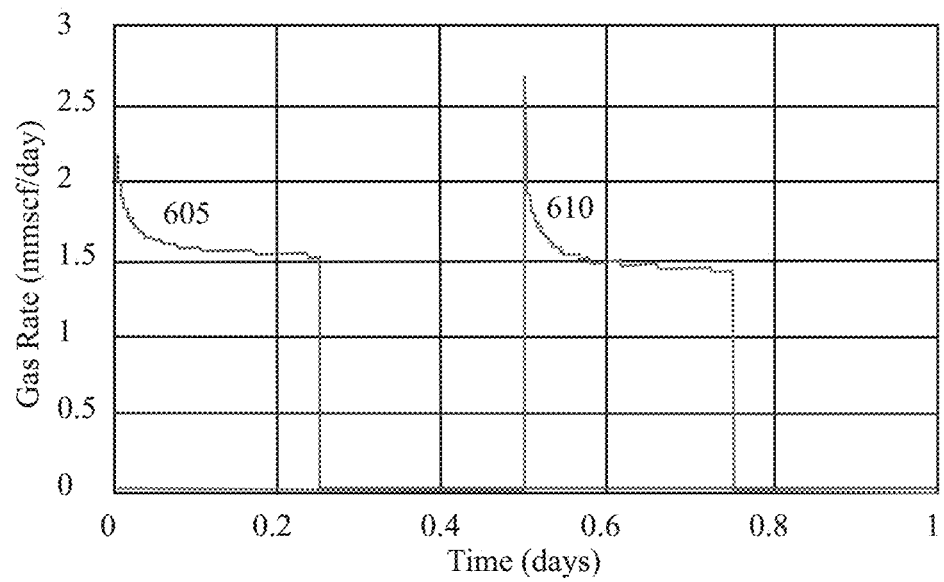
FIGS. 6A and 6B illustrate simulated rates for short- and long-term storage at a depleted reservoir in the Marcellus basin.
Figure 6B:
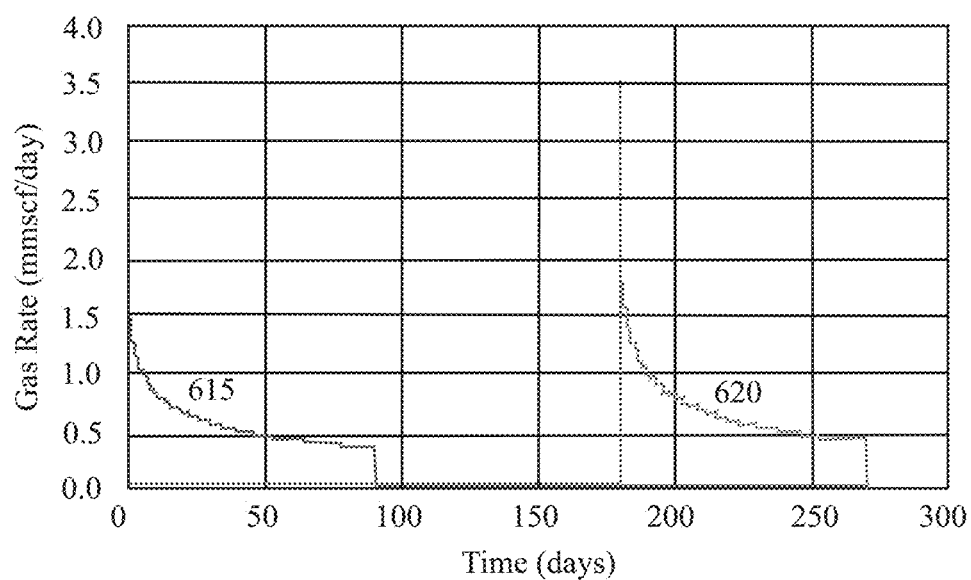

FIGS. 6A and 6B show simulated rates for short- and long-term storage at a depleted reservoir in the Marcellus basin. Short-term storage was simulated as an injection cycle time of approximately 6 hours, a first shutin time of approximately 6 hours, a production time of approximately 6 hours, and a second shutin time of approximately 6 hours. In some embodiments, the cycle time for short term storage could be longer, such as overnight and/or up to 24 hours. Long-term storage was simulated as an injection cycle of approximately 90 days, a first shutin time of approximately 90 days, a production time of approximately 90 days, and a second shutin time of approximately 90 days. In some embodiments, the cycle time for long-term storage could be less or more, such as 30 days, 60 days, and/or 120 days. FIG. 6A shows simulated rates for short-term storage at a depleted reservoir in the Marcellus basin. Line 605 shows the injection gas rate and line 610 shows the production gas rate. FIG. 6B shows simulated rates for long-term storage at a depleted reservoir in the Marcellus basin. Line 615 shows the injection gas rate and line 620 shows the production gas rate.

Figure 7A:
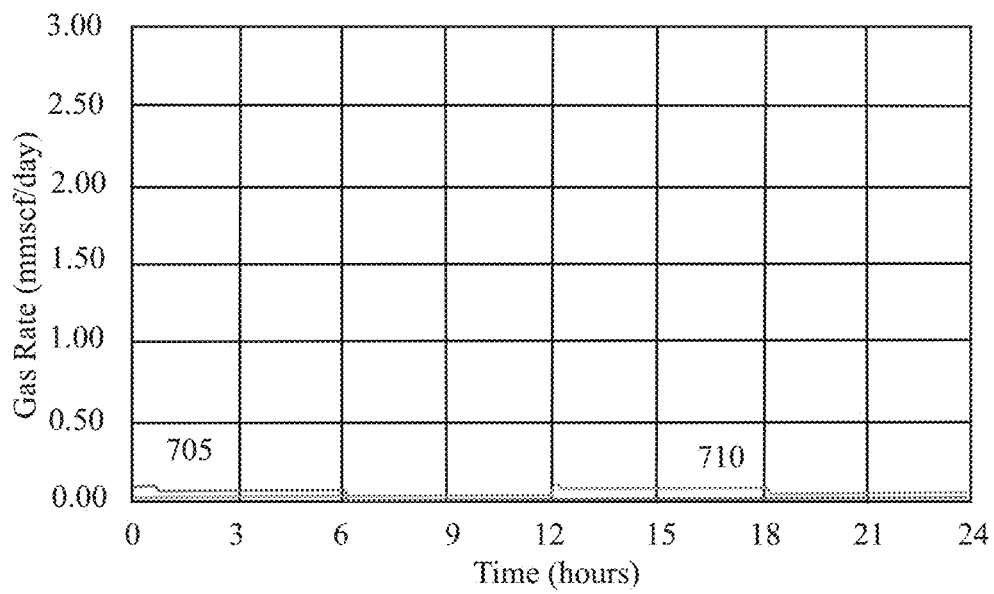
FIGS. 7A and 7B illustrate simulated rates for short- and long-term storage at a depleted reservoir in the Haynesville basin.
Figure 7B:
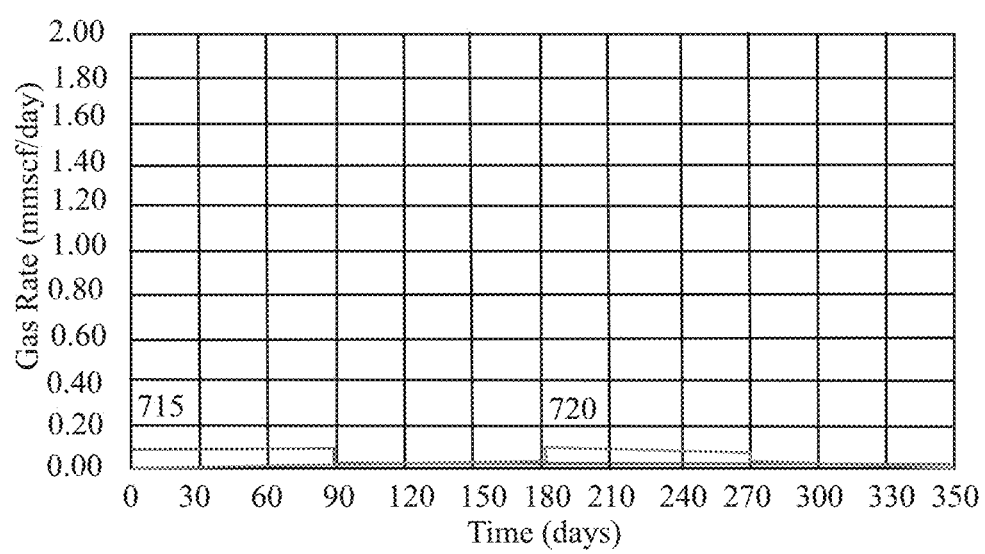

FIGS. 7A and 7B show simulated rates for short- and long-term storage at a depleted reservoir in the Haynesville basin. Short-term storage was simulated as an injection cycle time of approximately 6 hours, a first shutin time of approximately 6 hours, a production time of approximately 6 hours, and a second shutin time of approximately 6 hours. In some embodiments, the cycle time for short term storage could be longer, such as overnight and/or up to 24 hours. Long-term storage was simulated as an injection cycle of approximately 90 days, a first shutin time of approximately 90 days, a production time of approximately 90 days, and a second shutin time of approximately 90 days. In some embodiments, the cycle time for long-term storage could be less or more, such as 30 days, 60 days, and/or 120 days. FIG. 7A shows simulated rates for short-term storage at a depleted reservoir in the Haynesville basin. Line 705 shows the injection gas rate and line 710 shows the production gas rate. FIG. 7B shows the simulated rates for long-term storage at a depleted reservoir in the Haynesville basin. Line 715 shows in the injection gas rate and line 720 shows the production gas rate.

Figure 8A:
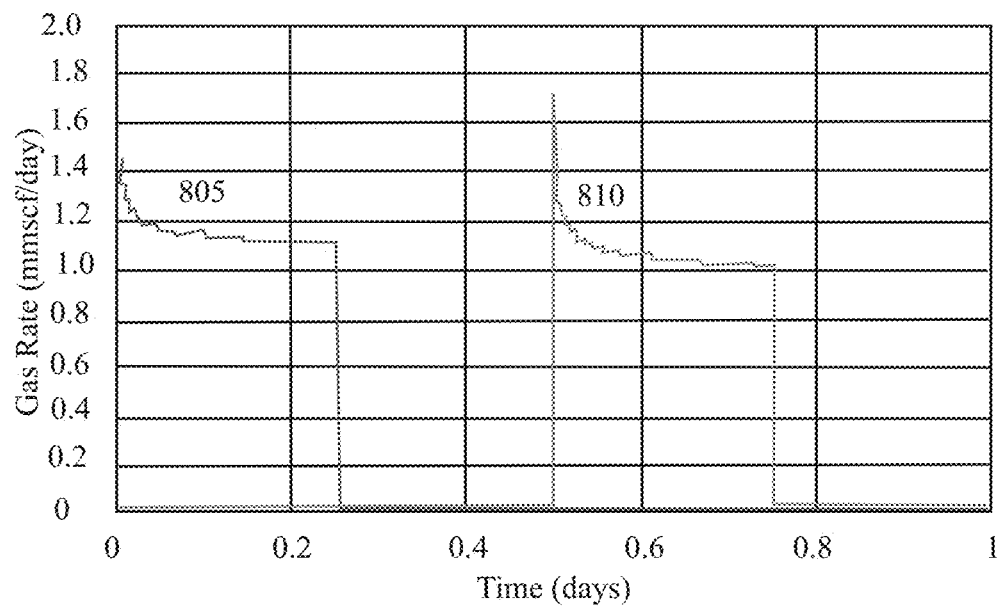
FIGS. 8A and 8B illustrate simulated rates for short- and long-term storage at a depleted reservoir in the Barnett basin.
Figure 8B:
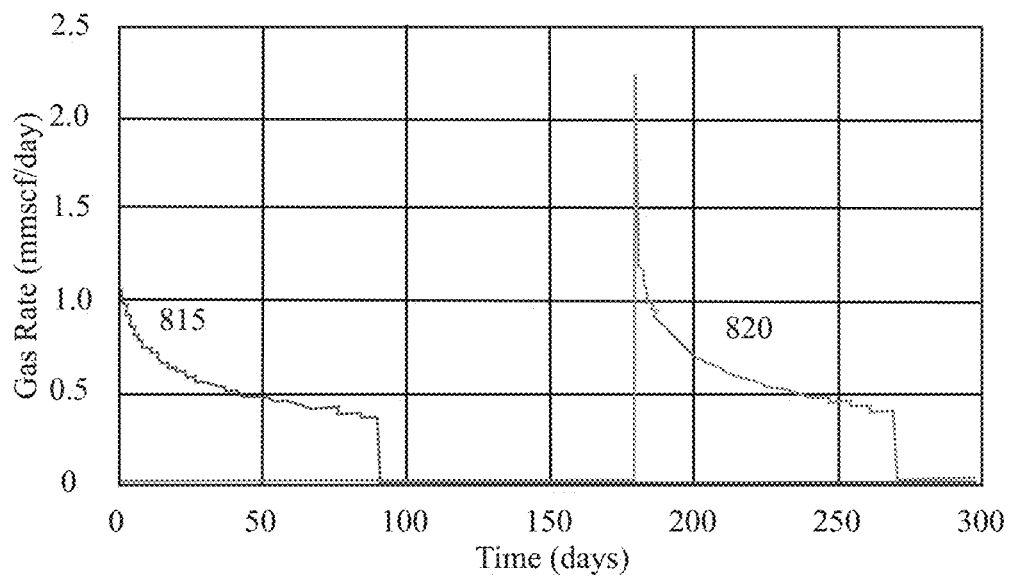

FIGS. 8A and 8B show simulated rates for short- and long-term storage at a depleted reservoir in the Barnett basin. Short-term storage was simulated as an injection cycle time of approximately 6 hours, a first shutin time of approximately 6 hours, a production time of approximately 6 hours, and a second shutin time of approximately 6 hours. In some embodiments, the cycle time for short term storage could be longer, such as overnight and/or up to 24 hours. Long-term storage was simulated as an injection cycle of approximately 90 days, a first shutin time of approximately 90 days, a production time of approximately 90 days, and a second shutin time of approximately 90 days. In some embodiments, the cycle time for long-term storage could be less or more, such as 30 days, 60 days, 90 days, 120 days, or 180 days. FIG. 8A shows simulated rates for short-term storage at a depleted reservoir in the Barnett basin. Line 805 shows the injection gas rate and line 810 shows the production gas rate. FIG. 8B shows the simulated gas rates for long-term storage at a depleted reservoir in the Barnett basin. Line 815 shows the injection rate and line 820 shows the production gas rate.

The Marcellus model resulted in average gas flow rates of 1.5 MMscfd for the short-term storage cycle and 0.7 MMscfd for the long-term storage. The Barnett results were similar, with flow rates of 1.1 MMscfd and 0.6 MMscfd for the short- and long-term storage cycles, respectively. These results assume 10-12 fracture stages, which is typical for wells drilled around 2011, when data used in these simulations was collected. The trend has been to complete increasingly longer horizontal wells with 40-60 (or more) hydraulic fracture stages. Because flow rates scale linearly with the number of fracture stages, it is foreseeable that modern wells (i.e., wells built more recently than 2011) could sustain flow rates of ~5 MMscfd for short-term storage cycles and ~2 MMscfd for long-term storage cycles. The gas flow rates for the Haynesville model results were about a factor of 10 lower. The Haynesville reservoir is initially geopressured and it experiences compaction during depletion, which reduces reservoir permeability.

In some embodiments, the methods described herein may be used for enhanced oil recovery. Models indicate that 3-4 weeks of shutin time may increase liquid hydrocarbon recovery. During the production cycle, BHP is maintained above 6,000 psia to minimize liquid dropout in the reservoir. The production cycle may last 4-5 weeks before rates become negligible. Models indicate that gas-injection enhanced oil recovery as described by some embodiments herein could yield a greater than 40% increase in the amount of oil recovered per well.

The foregoing disclosure includes various examples set forth merely as illustration. The disclosed examples are not intended to be limiting. Modifications incorporating the spirit and substance of the described examples may occur to persons skilled in the art. These and other examples are within the scope of this disclosure and the following claims.

The invention claimed is:

1. A system for storing thermal energy in the form of a compressed gas, the system comprising:
    a compressor configured to compress natural gas thereby creating the compressed gas having a temperature of approximately 275° F.;
    a pump configured to:
        inject the compressed gas into a reservoir of an oil well which had been hydraulically fractured prior to receiving the first quantity of compressed gas; and
        produce the compressed gas from the reservoir; and
    an expander configured to expand the compressed gas produced from the reservoir and cool the compressed gas to a temperature of approximately 100° F.

2. The system of claim 1, wherein the expander is capable of producing electricity from the expansion of the compressed gas.

3. The system of claim 1, wherein the compressed gas may be stored in the reservoir for a period of time.

4. The system of claim 3, wherein the period of time is less than one week.

5. The system of claim 3, wherein the period of time is greater than one week but less than one month.

6. The system of claim 3, wherein the period of time is greater than one month.

7. A method comprising in order:
    routing a first quantity of natural gas through a compressor, resulting in the first quantity being heated to a temperature of approximately 275° F.;
    injecting the first quantity into a reservoir through an oil well;
    storing the first quantity in the reservoir for a period of time;
    removing a second quantity of natural gas from the reservoir; and
    routing the second quantity through an expander, resulting in the second quantity being cooled to a temperature of approximately 100° F.

8. The method of claim 7, further comprising adding an amount of air to the second quantity during the removing.

9. The method of claim 8, wherein the amount of air and the second quantity are combusted prior to the routing of the second quantity through the expander.

10. The method of claim 9, wherein the amount of air is sub-stoichiometric.

11. The method of claim 7, wherein the first quantity and the second quantity are approximately equivalent.

12. The method of claim 7, wherein the first quantity is less than the second quantity.

13. The method claim 7, wherein the oil well had been hydraulically fractured prior to the routing.

14. The method of claim 7, wherein the period of time is less than one week and the first quantity is in the range of 1 to 5 million standard cubic feet (MMscf).

15. The method of claim 7, wherein the period of time is greater than one week but less than one month and the first quantity is in the range of 10 to 20 MMscf.

16. The method of claim 7, wherein the period of time is greater than one month and the first quantity is in the range of 50 to 150 MMscf.

* * * * *